US012644710B2

(12) United States Patent
Kim

(10) Patent No.: US 12,644,710 B2
(45) Date of Patent: Jun. 2, 2026

(54) SERVER, METHOD AND COMPUTER PROGRAM FOR DERIVING OPTIMAL ROUTE OF SHIP

(71) Applicant: WEATHERI INC., Seoul (KR)

(72) Inventor: Young Doh Kim, Seoul (KR)

(73) Assignee: WEATHERI INC., Seoul (KR)

( * ) Notice: Subject to any disclaimer, the term of this patent is extended or adjusted under 35 U.S.C. 154(b) by 83 days.

(21) Appl. No.: 18/758,462

(22) Filed: Jun. 28, 2024

(65) Prior Publication Data

US 2024/0353226 A1     Oct. 24, 2024

Related U.S. Application Data

(63) Continuation of application No. PCT/KR2021/020347, filed on Dec. 31, 2021.

(30) Foreign Application Priority Data

Dec. 28, 2021     (KR) ........................ 10-2021-0189761

(51) Int. Cl.
*G01C 21/20*          (2006.01)
*B63B 79/15*          (2020.01)
          (Continued)

(52) U.S. Cl.
CPC ............ *G01C 21/203* (2013.01); *B63B 79/15* (2020.01); *B63B 79/40* (2020.01); *G08G 3/02* (2013.01)

(58) Field of Classification Search
CPC .......... G06Q 50/40; G06Q 10/04; G08G 3/00; G08G 3/02; G01C 21/203; G01C 21/10; G01P 21/025; B63B 79/40; B63B 79/15
See application file for complete search history.

(56) References Cited

U.S. PATENT DOCUMENTS

2019/0178649 A1     6/2019  Lucus
2021/0156692 A1 *   5/2021  Moriwaki ............ G01C 21/203

FOREIGN PATENT DOCUMENTS

CN          110020459 A   *  7/2019  ............. G06F 30/20
CN          112749847 A       5/2021
          (Continued)

OTHER PUBLICATIONS

Wiśniewski, Bernard, and Maciej Szymański. "Comparison of ship performance optimization systems and the bon voyage onboard routing system." Zeszyty Naukowe Akademii Morskiej w Szczecinie 47 ,119: 106-115. (Year: 2016).*
          (Continued)

*Primary Examiner* — Cuong H Nguyen
(74) *Attorney, Agent, or Firm* — Merchant & Gould P.C.

(57)          ABSTRACT

An optimal route derivation server configured to derive an optimal route of a ship includes a storage unit configured to store marine data including winds, wave heights, and currents by matching the marine data with sailing data at each time point and each location included in the sailing data of each sailing obtained from an Automatic Identification System installed on a ship, a corrected ship speed derivation unit configured to derive a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location, a speed down curve derivation unit configured to derive a first speed down curve related to winds and a second speed down curve related to waves based on a basic speed, the second corrected ship speed and the third corrected ship speed of the ship, and a route determination unit configured to derive an optimal route of the ship by using a Speed
          (Continued)

Reduction Algorithm to which the first speed down curve or the second speed down curve is applied.

11 Claims, 4 Drawing Sheets

(51) Int. Cl.
    *B63B 79/40*        (2020.01)
    *G08G 3/02*        (2006.01)

(56)         References Cited

FOREIGN PATENT DOCUMENTS

| | | | | | |
|---|---|---|---|---|---|
| CN | 119647331 | B | * | 9/2025 | |
| EP | 3006322 | A1 | | 4/2016 | |
| EP | 3901579 | A1 | | 10/2021 | |
| JP | 2009286230 | A | | 12/2009 | |
| JP | 10-2011-0103082 | A | | 9/2011 | |
| JP | 2014-013145 | A | | 1/2014 | |
| JP | 10-2006925 | B1 | | 8/2019 | |
| JP | 2020104699 | A | | 7/2020 | |
| JP | 6895700 | B1 | * | 6/2021 | ............... G08G 3/00 |
| KR | 102042490 | B1 | * | 11/2019 | ............. G06F 16/27 |
| KR | 1020200022293 | A | | 3/2020 | |
| KR | 10-2109571 | B1 | | 5/2020 | |
| KR | 10-2020-0061679 | A | | 6/2020 | |
| KR | 20200061679 | A | * | 6/2020 | ............... G08G 3/02 |
| KR | 20240021497 | A | * | 2/2024 | ............... E02B 3/02 |
| WO | 2016185611 | A1 | | 5/2015 | |
| WO | WO-2017046893 | A1 | * | 3/2017 | ......... G01S 7/52004 |
| WO | 2020129225 | A1 | | 12/2018 | |
| WO | WO-2021106096 | A1 | * | 6/2021 | ............... G08G 3/00 |

OTHER PUBLICATIONS

Ouedraogo, Cheik Aboubakar, Aurelie Montarnal, and Didier Gourc. "Multimodal container transportation traceability and supply chain risk management: a review of methods and solutions." International Journal of Supply and Operations Management 9.2 212-234 (Year: 2022).*

An English-translated version of WO2017046893A1 by Ando et al (Year: 2017).*

Wiśniewski, Bernard, and Maciej Szymański. "Comparison of ship performance optimization systems and the bon voyage onboard routing system." Zeszyty Naukowe Akademii Morskiej w Szczecinie 47 (119 (2016): 106-115. (Year: 2016).*

An abstract of Drozd, Andrzej. "Ship's fuzzy speed curve." Zeszyty Naukowe Akademii Morskiej w Szczecinie 11 (83 (2006): 39-50. (Year: 2006).*

Sasa, Kenji, et al. "Speed loss analysis and rough wave avoidance algorithms for optimal ship routing simulation of 28,000-DWT bulk carrier." Ocean Engineering 228 (2021): 108800. (Year: 2021).*

Kytariolou, Ageliki, and Nikos Themelis. "Ship routing optimisation based on forecasted weather data and considering safety criteria." The Journal of Navigation 75.6 (2022): 1310-1331. (Year: 2022).*

Bentin Marcus et al: "A New Routing Optimization Tool-influence of Wind and Waves on Fuel Consumption of Ships with and without Wind Assisted Ship Propulsion Systems", Transportation Research Procedia, vol. 14, Jan. 1, 2016 (Jan. 1, 2016), pp. 153-162, XP093018904, ISSN: 2352-1465, DOI: 10.1016/j.trpro.2016.05. 051.

European Search Report received for EP Application No. 21970097.8 on Sep. 9, 2025, 8 pgs.

International Search Report for International Patent Application No. PCT/KR2021/020347 (Sep. 19, 2022).

Korean Office Action Received for KR Application No. 10-2021-0189761 on Jul. 30, 2024, 12 pgs.

\* cited by examiner

| Wind's speed $W_s$ [kn] | Wind's angle on the bow | | | | |
|---|---|---|---|---|---|
| | 0° | 45° | 90° | 135° | 180° |
| 0 | 100 | 100 | 100 | 100 | 100 |
| 2 | 95 | 97 | 98 | 99 | 100 |
| 4 | 83 | 89 | 92 | 94 | 96 |
| 6 | 70 | 76 | 81 | 84 | 88 |
| 8 | 55 | 60 | 65 | 69 | 75 |
| 10 | 40 | 46 | 50 | 54 | 60 |
| 12 | 30 | 35 | 40 | 44 | 50 |

FIG. 4

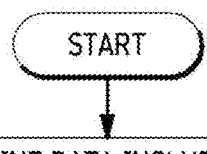

START

STORE MARINE DATA INCLUDING WINDS,
WAVE HEIGHTS, AND CURRENTS BY MATCHING
MARINE DATA WITH SAILING DATA AT EACH TIME
POINT AND EACH LOCATION INCLUDED IN SAILING
DATA OF EACH SAILING OBTAINED FROM AUTOMATIC
IDENTIFICATION SYSTEM INSTALLED ON SHIP — S410

DERIVE FIRST CORRECTED SHIP SPEED BY EXCLUDING
INFLUENCE OF CURRENTS FROM SPEED OF GROUND
FOR EACH SAILING AND DERIVE SECOND CORRECTED
SHIP SPEED BY CONSIDERING INFLUENCE OF WINDS
ON FIRST CORRECTED SHIP SPEED AT EACH LOCATION
AND THIRD CORRECTED SHIP SPEED BY CONSIDERING
INFLUENCE OF WAVES ON FIRST CORRECTED SHIP
SPEED AT EACH LOCATION — S420

DERIVE FIRST SPEED DOWN CURVE RELATED TO
WINDS AND SECOND SPEED DOWN CURVE RELATED
TO WAVES BASED ON BASIC SPEED, SECOND
CORRECTED SHIP SPEED AND THIRD CORRECTED
SHIP SPEED OF SHIP — S430

DERIVE OPTIMAL ROUTE OF SHIP BY USING SPEED
REDUCTION ALGORITHM TO WHICH FIRST SPEED
DOWN CURVE OR SECOND SPEED DOWN
CURVE IS APPLIED — S440

END

SERVER, METHOD AND COMPUTER PROGRAM FOR DERIVING OPTIMAL ROUTE OF SHIP

TECHNICAL FIELD

The present disclosure relates to a server, a method and a computer program for deriving an optimal route of a ship.

BACKGROUND

The Speed Reduction Algorithm (SRA) is used to calculate the location of a ship by analyzing the ship's speed reduction caused by the influence of weather factors and current factors.

The SRA is also used to evaluate the ship performance speed. A method of analyzing speed down curve during the entire sailing is used to calculate the ship performance speed. This is a method for calculating how much the speed of the ship is influenced by weather factors and current factors.

That is, the SRA is used to calculate the ship performance speed and the ship location, which serve as the main data for determining the route of the ship. In this case, the accuracy of the ship speed down curve is important in order to accurately calculate the ship performance speed and the ship location.

Regarding the technology of providing the route of a ship by analyzing the speed of the ship, prior art Korean Patent No. 10-2006925 discloses an apparatus and method for determining a route and speed of a vessel, and a recording medium.

Conventionally, even though individual ships have different degrees of influence by winds, waves, and currents, a fixed speed down curve is uniformly reflected to each ship and a recommended route is provided. That is, instead of a speed down curve for each ship, a speed down curve corresponding to the ship type or sister ship (same type or fleet) is adjusted at a predetermined rate and used, and, thus, an optimal recommended route reflecting sailing characteristics of each ship cannot be provided.

Also, conventionally, the ship location and sailing information can be obtained only when a sailing report of each ship is received from a shipping company. Therefore, algorithms that are not greatly modified from the conventional speed reduction algorithm have been used.

As described above, conventionally, actual sailing characteristics of individual ships cannot be reflected. Thus, the accuracy of the optimal recommended route of each ship is low.

DISCLOSURE OF THE INVENTION

Problems to be Solved by the Invention

The present disclosure is conceived to provide a server, method and computer program for storing marine data including winds, wave heights, and currents by matching the marine data with sailing data at each time point and each location included in the sailing data of each sailing obtained from an Automatic Identification System installed on a ship.

The present disclosure is conceived to provide a server, method and computer program for deriving a first corrected ship speed by excluding an influence of currents from a speed of a ship for each sailing, a second corrected ship speed by considering an influence of winds on the first corrected ship speed at each location, and a third corrected ship speed by considering an influence of waves on the first corrected ship speed at each location.

The present disclosure is conceived to provide a server, method and computer program for deriving a first speed down curve related to winds and a second speed down curve related to waves based on a basic speed, a second corrected ship speed and a third corrected ship speed of a ship, and an optimal route of the ship by using the Speed Reduction Algorithm (SRA) to which the first speed down curve or the second speed down curve is applied.

However, the problems to be solved by the present disclosure are not limited to the above-described problems. There may be other problems to be solved by the present disclosure.

Means for Solving the Problems

As a means for achieving the above-described technical problems, an aspect of the present disclosure provides an optimal route derivation server, including a storage unit configured to store marine data including winds, wave heights, and currents by matching the marine data with sailing data at each time point and each location included in the sailing data of each sailing obtained from an Automatic Identification System installed on a ship, a corrected ship speed derivation unit configured to derive a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location, a speed down curve derivation unit configured to derive a first speed down curve related to winds and a second speed down curve related to waves based on a basic speed, the second corrected ship speed and the third corrected ship speed of the ship, and a route determination unit configured to derive an optimal route of the ship by using a Speed Reduction Algorithm to which the first speed down curve or the second speed down curve is applied.

Another aspect of the present disclosure provides a method of deriving an optimal route, including storing marine data including winds, wave heights, and currents by matching the marine data with sailing data at each time point and each location included in the sailing data of each sailing obtained from an Automatic Identification System installed on a ship, deriving a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location, deriving a first speed down curve related to winds and a second speed down curve related to waves based on a basic speed, the second corrected ship speed and the third corrected ship speed of the ship, and deriving an optimal route of the ship by using a Speed Reduction Algorithm to which the first speed down curve or the second speed down curve is applied.

Yet another aspect of the present disclosure provides a computer program stored in a computer-readable medium including a sequence of instructions, which when executed by a computing device, causes a computing device to store marine data including winds, wave heights, and currents by matching the marine data with sailing data at each time point and each location included in the sailing data of each sailing obtained from an Automatic Identification System installed on a ship, derive a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location, derive a first speed down curve related to winds and a second speed down curve related to waves based on a basic speed, the second corrected ship speed and the third corrected ship speed of the ship, and derive an optimal route of the ship by using a Speed Reduction Algorithm to which the first speed down curve or the second speed down curve is applied.

The above-described aspects are provided by way of illustration only and should not be construed as liming the present disclosure. Besides the above-described embodiments, there may be additional embodiments described in the accompanying drawings and the detailed description.

Effects of the Invention

According to any one of the above-described means for solving the problems of the present disclosure, it is possible to provide a server, method and computer program for providing an optimal route in consideration of sailing characteristics of each ship by storing marine data including winds, wave heights, and currents by matching the marine data with sailing data at each time point and each location included in the sailing data of each sailing obtained from an Automatic Identification System installed on the ship, and by matching a vast amount of sailing data which are easy to collect and use with location-based marine data.

Also, it is possible to provide a server, method and computer program for deriving a first corrected ship speed by excluding an influence of currents from the speed of a ship for each sailing, and deriving a second corrected ship speed by considering an influence of winds on the first corrected ship speed at each location and a third corrected ship speed by considering an influence of waves on the first corrected ship speed at each location.

Further, it is possible to provide a server, method and computer program for deriving a first speed down curve related to winds and a second speed down curve related to waves based on a basic speed, a second corrected ship speed and a third corrected ship speed of a ship, and an optimal route of the ship by using the Speed Reduction Algorithm to which the first speed down curve or the second speed down curve is applied, and deriving the optimal route by using a unique speed down curve in consideration of sailing characteristics of the ship.

BRIEF DESCRIPTION OF THE DRAWINGS

FIG. 4 is a flowchart showing a method of deriving an optimal route of a ship performed by the optimal route derivation server according to an embodiment of the present disclosure.

BEST MODE FOR CARRYING OUT THE INVENTION

Figure 1:
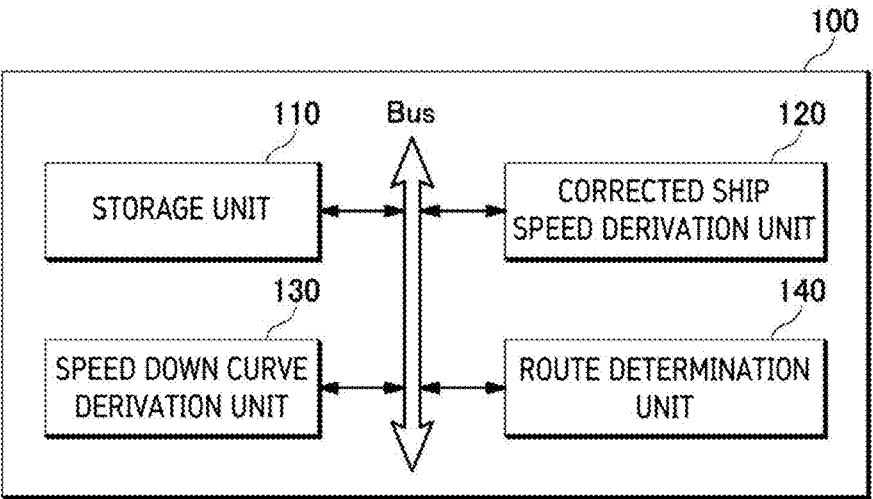
FIG. 1 is a configuration view of an optimal route derivation server according to an embodiment of the present disclosure.

Hereinafter, embodiments of the present disclosure will be described in detail with reference to the accompanying drawings to be readily implemented by a person with ordinary skill in the art to which the present invention belongs. However, it is to be noted that the present disclosure is not limited to the example embodiments but can be embodied in various other ways. In the drawings, parts irrelevant to the description are omitted in order to clearly explain the present disclosure, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

In the document, the term "unit" includes units realized by hardware, units realized by software, and units realized by using both hardware and software. Moreover, one unit may be realized by using two or more hardware, and two or more units may be realized by one hardware.

Some of the operations or functions described as being performed by a terminal or device in the document may alternatively be performed by a server connected to the terminal or device. Similarly, some of the operations or functions described as being performed by a server may alternatively be performed by a terminal or device connected to the server.

Hereinafter, an embodiment of the present disclosure will be described in detail with reference to the accompanying drawings.

FIG. 1 is a configuration view of an optimal route derivation server according to an embodiment of the present disclosure. Referring to FIG. 1, an optimal route derivation server 100 may include a storage unit 110, a corrected ship speed derivation unit 120, a speed down curve derivation unit 130, and a route determination unit 140. Herein, the optimal route derivation server 100 may derive a second corrected ship speed by considering the influence of winds on the speed of a ship and a third corrected ship speed by considering the influence of waves on the speed of the ship for each sailing, derive a first speed down curve related to winds and a second speed down curve related to waves based on the second corrected ship speed and the third corrected ship speed, and thus derive an optimal route of the ship by using the Speed Reduction Algorithm (SRA) to which the first speed down curve or the second speed down curve is applied. Hereinafter, the process of deriving an optimal route of a ship by each unit of the optimal route derivation server 100 will be described.

The storage unit 110 may store marine data including winds, wave heights, and currents by matching the marine data with sailing data at each time point and each location included in the sailing data of each sailing obtained from an Automatic Identification System (AIS) installed on the ship. Herein, the AIS is an automatic tracking system using a transceiver installed on a ship, and is mainly used for a ship traffic service. For example, the AIS can suppress a collision between ships on the sea by allowing a satellite to detect a signature of the AIS of the ship. The AIS may display, for example, the name, location, speed, type, expected departure time and expected arrival time at a port of entry of the ship. The sailing data may include the location, course and speed of the ship for each sailing.

The corrected ship speed derivation unit 120 may derive a first corrected ship speed by excluding an influence of currents from the speed of the ship for each sailing. For example, the corrected ship speed deriving unit 120 may calculate the first corrected ship speed according to Equation 1 below.

FIRST CORRECTED SHIP SPEED = [Equation 1]

$$SOG(\text{Speed of Ground}) - [\text{Current (Current Factor)}]$$

Referring to Equation 1, the speed of ground (SOG) may refer to the speed made good through the water, which is the speed of a ship on the sea as measured by satellites. The current factor refers to the number of currents encountered by a ship in a sailing route, and the influence of currents at each location can be identified by analyzing the current factor at each location along the route of the ship. The current factor may be calculated through, for example, $V_{current}\cos(\varphi)$. Herein, the first corrected ship speed excluding the influence of currents from the SOG is derived to analyze only the influences of winds and waves on the SOG.

The corrected ship speed derivation unit 120 may derive the second corrected ship speed by considering the influence of winds on the first corrected ship speed at each location and the third corrected ship speed by considering the influence of waves on the first corrected ship speed at each location.

The speed down curve derivation unit 130 may derive the first speed down curve related to winds and the second speed down curve related to waves based on a basic speed, the second corrected ship speed and the third corrected ship speed of the ship. Herein, the process of deriving the first speed down curve and the second speed down curve will be described in detail with reference to FIG. 2 and FIG. 3.

Figure 2:
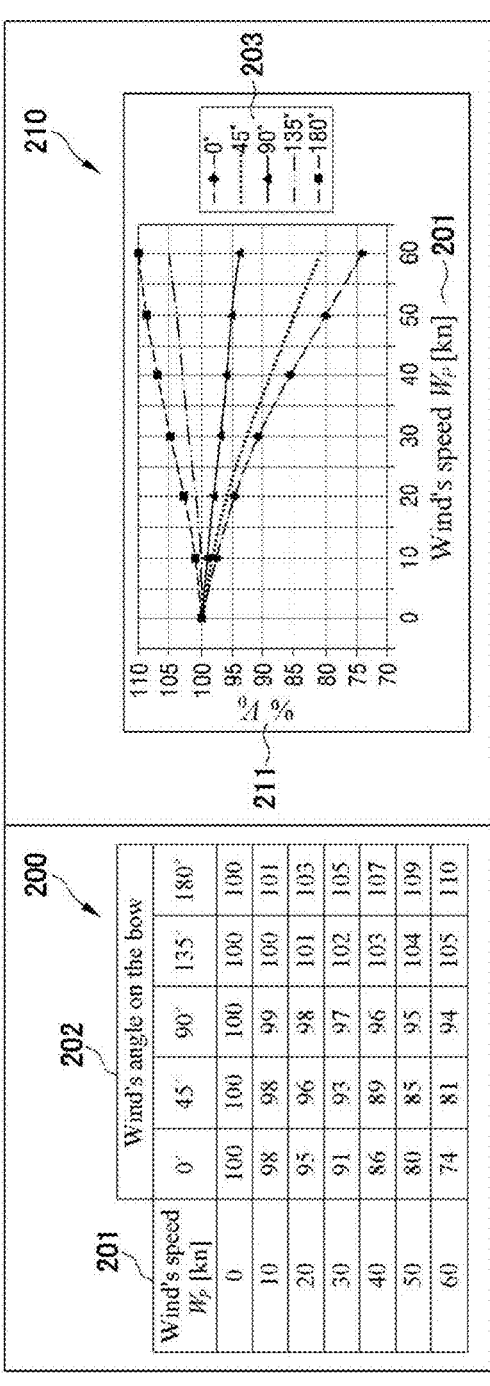
FIG. 2 is an exemplary diagram illustrating a process of deriving a first speed down curve according to an embodiment of the present disclosure.

FIG. 2 is an exemplary diagram illustrating a process of deriving a first speed down curve according to an embodiment of the present disclosure. Referring to FIG. 2, the corrected ship speed derivation unit 120 may derive a second corrected ship speed 200 based on wind's angle on the bow and wind's speed at each location.

For example, the corrected ship speed derivation unit 120 may derive the second corrected ship speed 200 depending on wind's speed 201 ($W_p$) and wind's angle on the bow 202. For example, the corrected ship speed derivation unit 120 may derive the second corrected ship speed 200 as 80 kn when the wind's angle on the bow 202 is 0° and the wind's speed 201 is 50 kn. For another example, the corrected ship speed derivation unit 120 may derive the second corrected ship speed 200 as 103 kn when the wind's angle on the bow 202 is 180° and the wind's speed 201 is 20 kn.

The speed down curve derivation unit 130 may derive a first speed down curve 210 related to winds based on the basic speed and the second corrected ship speed 200 of the ship. For example, the speed down curve derivation unit 130 may derive the first speed down curve 210 including a ratio 211 of the first corrected ship speed to the basic speed (e.g., 100 kn) of the ship at each wind's angle on the bow 203.

Figure 3:
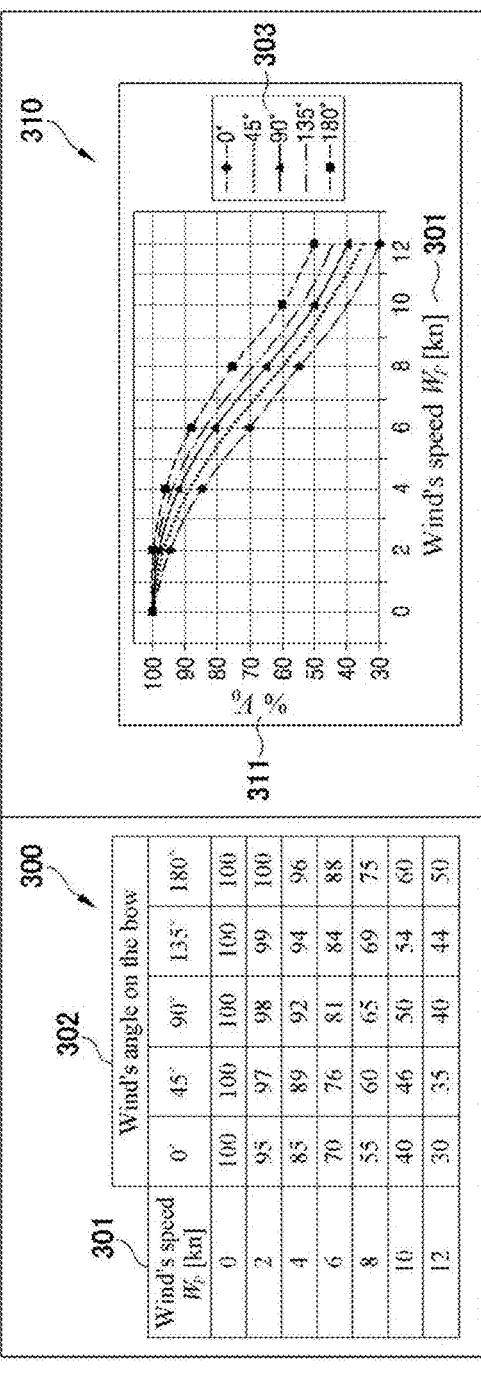
FIG. 3 is an exemplary diagram illustrating a process of deriving a second speed down curve according to an embodiment of the present disclosure.

FIG. 3 is an exemplary diagram illustrating a process of deriving a second speed down curve according to an embodiment of the present disclosure. Referring to FIG. 3, the corrected ship speed derivation unit 120 may derive a third corrected ship speed 300 based on wave's angle on the bow and wave's height at each location.

For example, the corrected ship speed derivation unit 120 may derive the third corrected ship speed 300 depending on wave's height 301 and wave's angle on the bow 302. For example, the corrected ship speed derivation unit 120 may derive the third corrected ship speed 300 as 40 kn when the wave's angle on the bow 302 is 0° and the wave's height 301 is 10 h. For another example, the corrected ship speed derivation unit 120 may derive the third corrected ship speed 300 as 96 kn when the wave's angle on the bow 302 is 180° and the wave's height 301 is 4 h.

The speed down curve derivation unit 130 may derive a second speed down curve 310 related to waves based on the basic speed and the third corrected ship speed 300 of the ship. For example, the speed down curve derivation unit 130 may derive the second speed down curve 310 including a ratio 311 of the first corrected ship speed to the basic speed (e.g., 100 kn) of the ship at each wave's angle on the bow 303.

Referring to FIG. 1 again, the route determination unit 140 may derive an optimal route of the ship by using the Speed Reduction Algorithm to which the first speed down curve or the second speed down curve is applied.

The route determination unit 140 may derive priorities of influences on the first speed down curve and the second speed down curve by comparison between the second corrected ship speed and the third corrected ship speed at each location. For example, the route determination unit 140 may derive the priorities of influences on the first speed down curve and the second speed down curve based on whether the SOG is more influenced by winds or waves by comparison between the second corrected ship speed and the third corrected ship speed at each location.

For example, the route determination unit 140 may derive the priorities of influences on the first speed down curve and the second speed down curve for each of a plurality of sailing sections, or may derive the priorities of influences on the first speed down curve and the second speed down curve for the entire sailing section.

The route determination unit 140 may derive an optimal route of the ship by using the Speed Reduction Algorithm to which either one the first speed down curve and the second speed down curve is applied based on the derived priorities of influences. For example, when the influence on the first speed down curve is greater than that on the second speed down curve according to the derived priorities of influences, the influence of winds on the SOG is greater than the influence of waves on the SOG, and, thus, the route determination unit 140 may derive an optimal route of the ship by using the Speed Reduction Algorithm to which the first speed down curve is applied. For another example, when the influence on the second speed down curve is greater than that on the first speed down curve according to the derived priorities of influences, the influence of waves on the SOG is greater than the influence of winds on the SOG, and, thus, the route determination unit 140 may derive an optimal route of the ship by using the Speed Reduction Algorithm to which the second speed down curve is applied.

For yet another example, the route determination unit 140 may derive an optimal route for each sailing section by using the Speed Reduction Algorithm to which either one the first speed down curve and the second speed down curve is applied for each sailing section.

For example, when the first speed down curve has a higher priority of influence than the second speed down curve for a first sailing section, the route determination unit 140 may derive an optimal route for the first sailing section by using the Speed Reduction Algorithm to which the first speed down curve is applied, and when the second speed down curve has a higher priority of influence than the first speed down curve for a second sailing section, the route determination unit 140 may derive an optimal route for the second sailing section by using the Speed Reduction Algorithm to which the second speed down curve is applied.

The storage unit 110 may update the first speed down curve and the second speed down curve for each sailing. For example, if the first speed down curve and the second reduction curve are derived by the speed down curve derivation unit 130 whenever sailing data obtained during sailing of the ship are stored, the storage unit 110 may update the first speed down curve and the second speed down curve and thus may provide an optimal route of the ship and improve the accuracy of the optimal route.

Therefore, according to the present disclosure, sailing data generated when a ship actually sails without receiving a sailing report of the ship from a shipping company are used, and, thus, the amount of the sailing data is vast and it is easy to collect and use the sailing data. Accordingly, it is possible to apply the sailing data to various ships. Also, it is free to fuse and match the sailing data with location-based global marine data, which provides high utility.

The optimal route derivation server 100 may be executed by a computer program stored in a medium including a sequence of instructions for deriving an optimal route of a ship. When executed by a computing device, the computer program causes a computing device to store marine data including winds, wave heights, and currents by matching the marine data with sailing data at each time point and each location included in the sailing data of each sailing obtained from an Automatic Identification System installed on the ship, derive a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location, derive a first speed down curve related to winds and a second speed down curve related to waves based on a basic speed, the second corrected ship speed and the third corrected ship speed of the ship, and derive an optimal route of the ship by using the Speed Reduction Algorithm to which the first speed down curve or the second speed down curve is applied.

FIG. 4 is a flowchart showing a method of deriving an optimal route of a ship performed by the optimal route derivation server according to an embodiment of the present disclosure. Referring to FIG. 4, the method of deriving an optimal route of a ship performed by the optimal route derivation server 100 includes the processes time-sequentially performed according to the embodiment illustrated in FIG. 1 to FIG. 3. Therefore, descriptions of the embodiment illustrated in FIG. 1 to FIG. 3 may be applied to the method of deriving an optimal route of a ship performed by the optimal route derivation server 100, even though they are omitted hereinafter.

In S410, the optimal route derivation server 100 may store marine data including winds, wave heights, and currents by matching the marine data with sailing data at each time point and each location included in the sailing data of each sailing obtained from the AIS installed on a ship.

In S420, the optimal route derivation server 100 may derive a first corrected ship speed by excluding an influence of currents from the SOG for each sailing and derive a second corrected ship speed by considering an influence of winds on the first corrected ship speed at each location and a third corrected ship speed by considering an influence of waves on the first corrected ship speed at each location.

In S430, the optimal route derivation server 100 may derive a first speed down curve related to winds and a second speed down curve related to waves based on a basic speed, the second corrected ship speed and the third corrected ship speed of the ship.

In S440, the optimal route derivation server 100 may derive an optimal route of the ship by using the Speed Reduction Algorithm to which the first speed down curve or the second speed down curve is applied.

In the descriptions above, S410 to S440 may be divided into additional processes or combined into fewer processes depending on an embodiment. In addition, some of the processes may be omitted and the sequence of the processes may be changed if necessary.

The method of deriving an optimal route of a ship performed by the optimal route derivation server illustrated in FIG. 1 to FIG. 4 can be implemented as a computer program stored in a medium to be executed by a computer or a recording medium including instructions executable by a computer. Also, the method of deriving an optimal route of a ship performed by the optimal route derivation server illustrated in FIG. 1 to FIG. 4 can be implemented as a computer program stored in a medium to be executed by a computer.

A computer-readable medium can be any available medium accessible by a computer, including volatile and non-volatile media, removable and non-removable media. Additionally, a computer-readable medium may include computer storage media. Computer storage media includes both volatile and non-volatile, removable and non-removable media implemented in any method or technology for storage of information such as computer-readable instructions, data structures, program modules, or other data.

The above description of the present disclosure is provided for the purpose of illustration, and it would be understood by a person with ordinary skill in the art to which the present disclosure belongs that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner, likewise, components described to be distributed can be implemented in a combined manner.

The scope of the present disclosure is defined by the following claims rather than by the detailed description of the embodiment, and it should be understood that all modifications and embodiments conceived from the meaning and scope of the claims and their equivalents are included in the scope of the present disclosure.

I claim:

1. An optimal route derivation server configured to determine an optimal route of a ship having a bow, comprising:

a storage unit configured to store marine data including winds, wave heights, and currents by matching the marine data with sailing data at each time point and each location included in the sailing data of each sailing of the ship;

a corrected ship speed derivation unit configured to derive a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location;

a speed down curve derivation unit configured to derive a first speed down curve related to winds and a second speed down curve related to waves based on a basic speed, the second corrected ship speed and the third corrected ship speed of the ship; and a route determination unit configured to determine the optimal route of the ship based on the first speed down curve or the second speed down curve, wherein the speed down curve derivation unit derives the first speed down curve including a ratio of the first corrected ship speed to the basic speed of the ship for each wind's speed at each wind's angle on the bow, and the second speed down curve including a ratio of the first corrected ship speed to the basic speed of the ship for each wave's height at each wave's angle on the bow, and wherein the optimal route is provided to the ship to operate the ship.

2. The optimal route derivation server of claim 1, wherein the corrected ship speed derivation unit derives the second corrected ship speed based on wind's angle on the bow and wind's speed at each location and the third corrected ship speed based on wave's angle on the bow and wave's height at each location.

3. A non-transitory computer-readable storage medium storing a program including a sequence of instructions for determining an optimal route of a ship having a bow, which when executed by a computing device, causes a computing device to:

store marine data including winds, wave heights, and currents by matching the marine data with sailing data at each time point and each location included in the sailing data of each sailing;

derive a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location;

derive a first speed down curve related to winds and a second speed down curve related to waves based on a basic speed, the second corrected ship speed and the third corrected ship speed of the ship;

determine the optimal route of the ship based on the first speed down curve or the second speed down curve, wherein deriving the first speed down curve includes calculating a ratio of the first corrected ship speed to the basic speed of the ship for each wind's speed at each wind's angle on the bow, and deriving the second speed down curve includes calculating a ratio of the first corrected ship speed to the basic speed of the ship for each wave's height at each wave's angle on the bow, and use the optimal route to operate the ship.

4. The optimal route derivation server of claim 1, wherein the route determination unit derives priorities of influences on the first speed down curve and the second speed down curve by comparison between the second corrected ship speed and the third corrected ship speed at each location, and determines the optimal route of the ship based on the derived priorities of influences.

5. The optimal route derivation server of claim 1, wherein the storage unit updates the first speed down curve and the second speed down curve for each sailing.

6. The optimal route derivation server of claim 1, wherein the sailing data include at least one of a location, a course and a speed of the ship for each sailing.

7. A method of determining an optimal route of a ship having a bow, comprising:

storing marine data including winds, wave heights, and currents by matching the marine data with sailing data at each time point and each location included in the sailing data of each sailing of the ship;

deriving a first corrected ship speed by excluding an influence of currents from a speed of the ship for each sailing, a second corrected ship speed by considering an influence of winds on the first corrected ship speed at each location, and a third corrected ship speed by considering an influence of waves on the first corrected ship speed at each location;

deriving a first speed down curve related to winds and a second speed down curve related to waves based on a basic speed, the second corrected ship speed and the third corrected ship speed of the ship;

determining the optimal route of the ship based on the first speed down curve or the second speed down curve, wherein deriving the speed down curve includes:

deriving the first speed down curve including a ratio of the first corrected ship speed to the basic speed of the ship for each wind's speed at each wind's angle on the bow; and deriving the second speed down curve including a ratio of the first corrected ship speed to the basic speed of the ship for each wave's height at each wave's angle on the bow, and using the optimal route to operate the ship.

8. The method of deriving an optimal route of claim 7, wherein the deriving the corrected ship speed includes:

deriving the second corrected ship speed based on wind's angle on the bow and wind's speed at each location; and deriving the third corrected ship speed based on wave's angle on the bow and wave's height at each location.

9. The method of deriving an optimal route of claim 7, wherein the sailing data include at least one of a location, a course and a speed of the ship for each sailing.

10. The method of deriving an optimal route of claim 7, wherein determining the optimal route includes:

deriving priorities of influences on the first speed down curve and the second speed down curve by comparison between the second corrected ship speed and the third corrected ship speed at each location; and determining the optimal route of the ship based on the derived priorities of influences.

11. The method of deriving an optimal route of claim 7, further comprising:

updating the first speed down curve and the second speed down curve for each sailing.

\* \* \* \* \*